Nov. 10, 1936.　　　H. W. KNOWLTON　　　2,060,507
DUST REMOVER FOR PICKERS
Filed March 14, 1936　　　2 Sheets-Sheet 1

Inventor:
Harry W. Knowlton,
by Walter E. Lombard,
Atty.

Nov. 10, 1936.  H. W. KNOWLTON  2,060,507
DUST REMOVER FOR PICKERS
Filed March 14, 1936  2 Sheets-Sheet 2
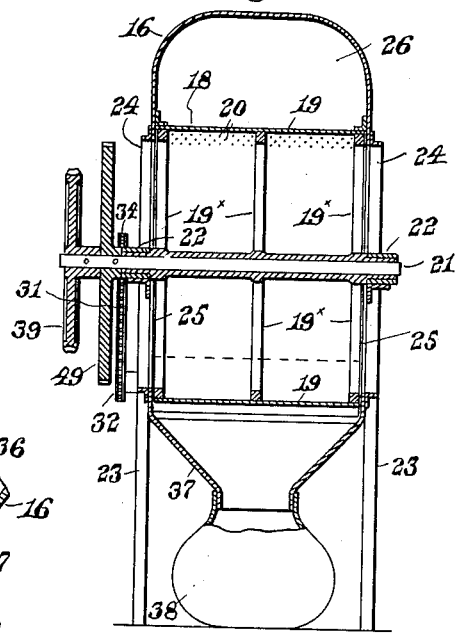
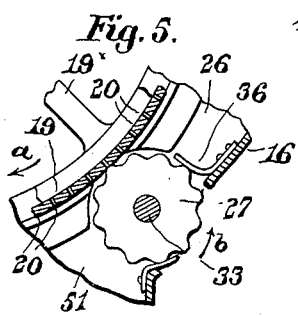
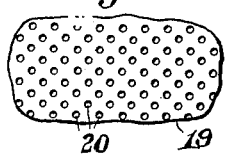
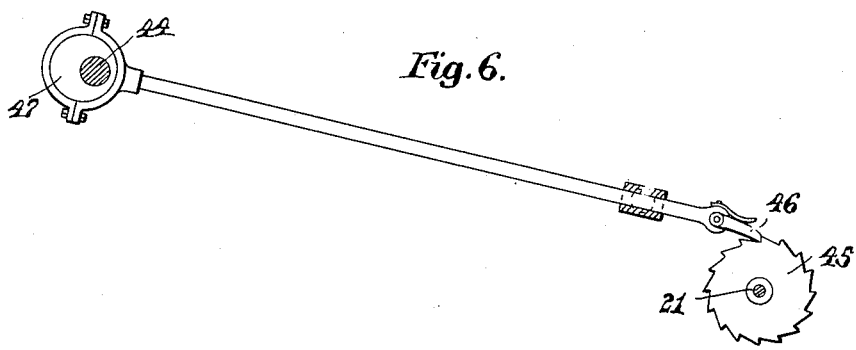
Inventor:
Harry W. Knowlton,
by Walter E. Lombard
Atty.

Patented Nov. 10, 1936

2,060,507

UNITED STATES PATENT OFFICE 2,060,507

DUST REMOVER FOR PICKERS

Harry W. Knowlton, Lowell, Mass., assignor to Knowlton & Newton Co. Inc., Lowell, Mass., a corporation of Massachusetts Application March 14, 1936, Serial No. 68,843

15 Claims. (Cl. 19—89)

This invention relates to pickers for beating cotton and forming a continuous sheet thereof, and has for its object the provision of means confined within the machine whereby all dust in the cotton being treated may be removed therefrom and delivered to a receptacle adapted to be disposed in a closed chamber of the machine, and in this manner preventing any of the dust from entering the room where it would be injurious to the health of the workmen employed therein.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings—

Figure 3 represents a transverse section of same on line 3, 3 on Fig. 2.

Figure 4 represents an elevation of a portion of the perforated plate of the rotating drum.

Figure 5 represents an enlarged detail of a means for controlling the discharge of dust from the air passage of the dust removing device, and Figure 6 represents a detail of one form of mechanism for imparting rotary movement to the perforated drum.

Similar characters indicate like parts throughout the several figures of the drawings.

Figure 1:
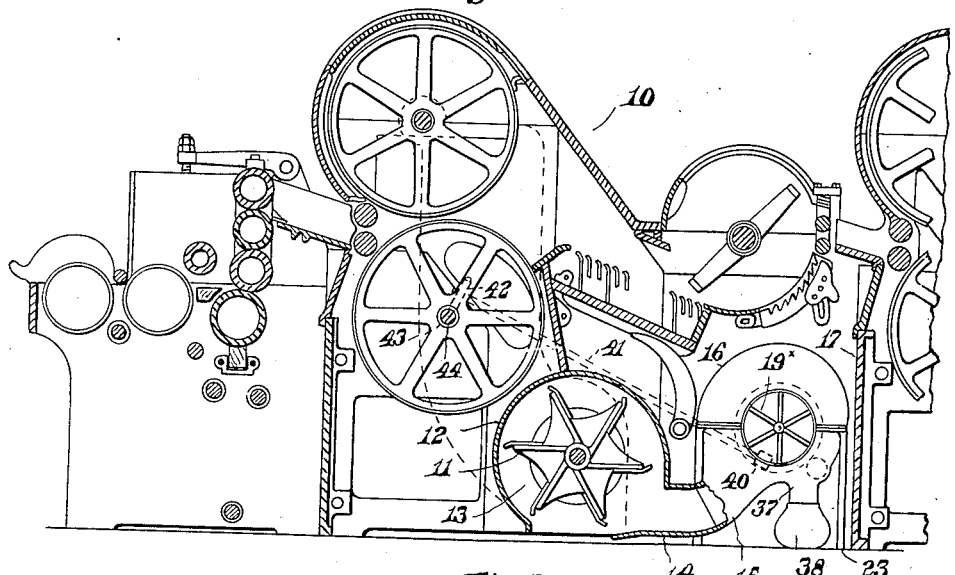
Figure 1 represents a longitudinal vertical section of a picker having installed therein devices embodying the principles of the present invention.

In the drawings, 10 is a portion of a picker of usual construction having embodied therein a rotatable fan 11 in an enclosure 12 having openings 13 at the opposite ends thereof through which air saturated with dust is admitted.

The enclosure 12 has a discharge outlet 14 which is connected to an inlet 15 of a housing 16 located in a closed chamber 17 of said picker.

Within the housing 16 is a revoluble drum 18, the periphery of which is formed preferably of a metal plate 19 provided with a plurality of small perforations 20 extending therethrough.

The perforated plate 19 is mounted upon a plurality of spoked wheels or spiders 19x secured to and rotatable with a revoluble shaft 21 mounted in bearings 22 in a framework 23.

The housing 16 is provided with openings 24 at the opposite ends thereof, these openings being disposed opposite the open ends 25 of the drum 18.

Between the periphery of the drum 18 and the peripheral wall of the housing 16 is a passage 26 which communicates at one end through the inlet 15 with the discharge outlet 14 of the enclosure 12.

When the picker mechanism is in operation and the air within the machine becomes saturated with dust, this air thus saturated with dust will be admitted to the enclosure 12 and forced by the fan 11 into the passage 26.

The most of the air in this passage 26 will pass through the small perforations 20 into the interior of the drum 18 and then be discharged from the opposite ends thereof free from dust and pass through the openings 24 into the chamber 17 and then through the interior of the machine.

The dust will accumulate on the periphery of the drum 18 and be carried thereby to the exit of said passage 26, at which point is located a revoluble roller 27, the periphery of which contacts with the periphery of the drum 18.

This roller 27 is mounted on a lever 28 pivoted at 29 and having a spring 30 acting thereon to keep the drum 18 and roller 27 in contact at all times.

The roller 27 may be rotated by means of a sprocket chain 31 interposed between a sprocket wheel 32 on the roller shaft 33 and another sprocket wheel 34 on the pivot 35 of the lever 28.

The sprocket wheel 34 may be driven in any well known manner.

Figure 2:
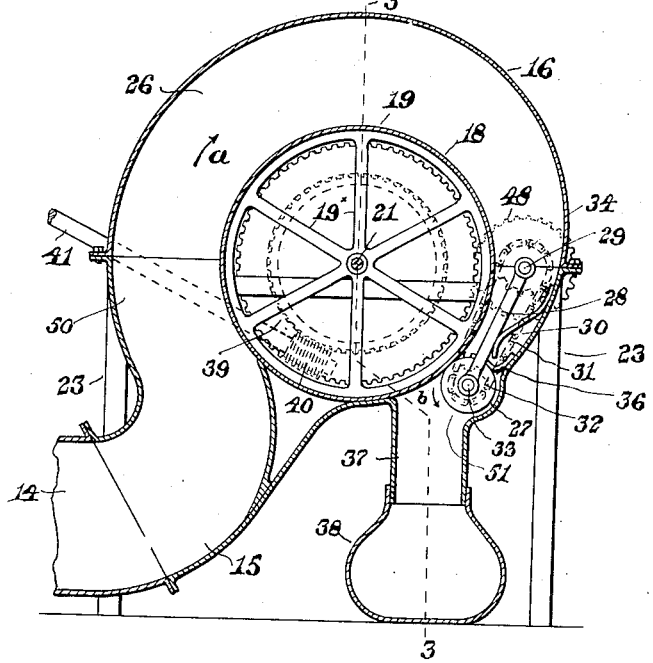
Figure 2 represents a vertical section of the device for removing dust from the air passing through said picker mechanism.

This roller 27 may have a smooth and unbroken peripheral surface (as shown in Fig. 2) or may be ribbed or corrugated as shown in Fig. 5 with the ends of the ribs or corrugations contacting with the periphery of the drum 18.

The interior of the housing 16 is provided with a flexible member 36 bearing on the top of the roller 27 and preventing any dust from being discharged at this point.

All of the dust in the passage 26 must therefore be discharged from the passage between the drum 18 and the roller 27.

Below the roller 27 the housing 16 is provided with a discharge outlet pipe 37 to which may be secured a bag 38 or other receptacle to hold all of the dust separated from the air passing through the housing 16.

The drum shaft 21 may have a gear 39 secured to one end, the teeth of which mesh with a worm 40 mounted on a shaft 41 the opposite end of which is provided with a gear 42 meshing with a worm 43 on a revoluble shaft 44 forming a part of the picker mechanism.

If desired, instead of the gear 39 the drum 18 may have at one end a ratchet 45 with which a pawl 46 engages, this pawl 46 being given a step by step movement by some member forming a revoluble part of the picker mechanism, as for instance, an eccentric 47 mounted on the shaft 44.

The sprocket wheel 34 may have a gear 48 secured thereto with the teeth of said gear meshing with the gear 49 on the drum shaft 21, thus providing a means for rotating the roller 27 simultaneously with the drum 18.

The drum 18 rotates in the direction of the arrow a and the roller 27 rotates in the direction of the arrow b.

A fine mesh screen may be used in the drum 18 in place of the metal perforated plate 19.

The passage 26 gradually decreases from its inlet end 50 to its outlet end 51 and as a consequence the volume of dust-laden air entering the passage 26 is restricted in its passage and must find some way of escape which it does by passing through the perforations 20 into the interior of the drum 18 where it may escape into the chamber 17 entirely free from dust and other particles.

The outlet end 51 of the passage 26 is normally closed by the roller 27 but when the roller 27 is rotated a restricted amount of dust will be permitted to pass into the dust outlet passage 37 and then into the bag 38.

The present device prevents any dust-laden air which is in the picker from escaping into the rooms of mills in which pickers are installed and thereby getting into the eyes, ears and nostrils, of workmen and thus interfering with their work.

When the dust gets into the eyes, ears and nostrils it often causes serious injury to said workmen.

These objections are overcome by installing in each picker a dust removing device as shown and described.

By this means the air circulating in the room is kept constantly free from all impurities which obviously is a great advantage.

The entire apparatus is simple in construction and inexpensive to manufacture and operate.

It is believed that the many advantages of the invention will be understood readily without further description.

Having thus described my invention, I claim

1. In a picker provided with a revoluble fan; an enclosure for said fan having an outlet therefrom and an inlet thereto from the picker mechanism; a housing in a closed chamber of said picker; an open ended rotatable drum within said housing having a plurality of small perforations in its periphery, the periphery of said drum and the wall of said housing forming a closed air passage substantially surrounding said drum one end of said passage communicating directly with the outlet from said fan enclosure; yielding means at the other end of said passage for controlling the discharge of dust passing through said passage, and an air outlet extending from an open end of said drum into said closed chamber.

2. A picker as set forth in claim 1 in which a fixed walled dust outlet extends downwardly from the periphery of said rotatable drum, and the lower end of said closed air passage.

3. A picker as set forth in claim 1 in which the dust particles in said air passage are discharged from its lower end into a fixed dust outlet extending downwardly from the periphery of said drum.

4. A picker as set forth in claim 1 in which the means for controlling the discharge of dust consists of a movable member at the lower end of said air passage and contacting with but disconnected from the periphery of said drum.

5. A picker as set forth in claim 1 in which the controlling means for the discharge of dust particles in said air passage is a rotatable member located at the lower discharge end of said air passage.

6. A picker as set forth in claim 1 in which the means for controlling the discharge of dust consists of a rotatable member provided with a plurality of blades the outer ends of which contact with the periphery of said drum at a point adjacent the lower discharge end of said air passage.

7. A picker as set forth in claim 1 in which the means for controlling the discharge of dust consists of a rotatable member yieldingly retained in contact with the periphery of the drum under normal conditions.

8. A picker as set forth in claim 1 in which the drum is rotated by means driven from a revoluble shaft forming a part of the picker mechanism.

9. A picker as set forth in claim 1 in which the drum is provided with a gear actuated by a worm driven by a revoluble shaft forming a part of the mechanism.

10. A picker as set forth in claim 1 in which a dust outlet provided with a removable receptacle is associated with the means for controlling the discharge of air from said air passage.

11. A picker as set forth in claim 1 in which the drum-casing is confined within the closed chamber of said picker and in which the air from the interior of the drum is discharged into said chamber.

12. A picker as set forth in claim 1 in which the drum is rotated by means consisting in part of a worm gear on the drum shaft and a revoluble worm in mesh therewith.

13. A picker as set forth in claim 1 in which the drum is rotated by means consisting in part of a ratchet on the drum shaft, a pawl coacting therewith on a reciprocating member and an eccentric on a shaft of the picker mechanism for imparting reciprocation to said member.

14. A picker as set forth in claim 1 in which the yielding means consists of a swinging spring-pressed arm having a roller at its outer end contacting with the periphery of said drum.

15. A picker as set forth in claim 1 in which the yielding means consists of a swinging spring-pressed arm having a roller at its outer end contacting with the periphery of said drum, said roller being rotatable by a revoluble member alined with the pivot of said arm and driven by a gear rotatable with said drum.

HARRY W. KNOWLTON.